United States Patent [19]

Kamoto et al.

[11] Patent Number: 5,880,176
[45] Date of Patent: Mar. 9, 1999

[54] FLUORESCENT MARKING COMPOSITION AND FLUORESCENT MARK FORMED BY SAID COMPOSITION

[75] Inventors: Takanori Kamoto; Yoshinori Yamamoto, both of Takatsuki; Toshinobu Sueyoshi, Otokuni-gun, all of Japan

[73] Assignee: Hitachi Maxell, Ltd., Osaka-fu, Japan

[21] Appl. No.: 546,456

[22] Filed: Oct. 20, 1995

[30] Foreign Application Priority Data

Oct. 21, 1994 [JP] Japan .................................. 6-282757
Nov. 10, 1994 [JP] Japan .................................. 6-301547
Dec. 28, 1994 [JP] Japan .................................. 6-338625

[51] Int. Cl.$^6$ ...................................................... F21V 7/22
[52] U.S. Cl. .......................... 523/172; 524/522; 524/523; 524/524; 260/DIG. 38; 106/31.14; 106/31.23; 523/201
[58] Field of Search .................... 523/172, 201; 260/DIG. 38; 106/21 R, 21 A, 31.14, 31.23; 524/522, 523, 534

[56] References Cited

U.S. PATENT DOCUMENTS 4,202,491  5/1980  Suzuki ...................................... 235/491
5,093,147  3/1992  Andrus et al. .............................. 427/7
5,336,714  8/1994  Krutak et al. ............................ 524/608
5,460,646  10/1995 Lazzouni et al. ..................... 106/21 R

FOREIGN PATENT DOCUMENTS

0286219A2  10/1988  European Pat. Off. .
0497507A2  8/1992   European Pat. Off. .
539607     7/1976   Japan .
54-22326   6/1978   Japan .

OTHER PUBLICATIONS

A. Kinoshita, The Society of Polymer Science (1988) *Ink Jet Printing Inks*, pp. 67–70.

*Primary Examiner*—Marion McCamish
*Assistant Examiner*—John J. Guarriello
*Attorney, Agent, or Firm*—Birch, Stewart, Kolasch & Birch, LLP

[57] ABSTRACT

A fluorescent marking composition containing particles of an organic material which has a glass transition temperature of at least 30° C. and an average particle size of at least 30 nm, and emitting fluorescence in a visible light range, or absorbing infrared light having a wavelength of at least 700 nm and emitting a light in an infrared wavelength range, which composition is excellent in dispersion stability, light resistance, and heat and light resistance, and provides a mark which does not bleed.

17 Claims, 5 Drawing Sheets

FIG.4

FLUORESCENT MARKING COMPOSITION AND FLUORESCENT MARK FORMED BY SAID COMPOSITION

BACKGROUND OF THE INVENTION

1. Field of the Invention

The present invention relates to a fluorescent marking composition and a fluorescent mark formed by said composition. More particularly, the present invention relates to a fluorescent marking composition which is excellent in dispersion stability, light resistance, heat resistance and water resistance, and a mark formed by said composition which does not bleed and has excellent light resistance, heat resistance and water resistance.

2. Description of the Related Art

In these years, information such as a company name or a trade name of a good is indicated by a bar code, and a bar code pattern is optically read to utilize such information for totaling sales amounts or analyzing distribution of goods.

Usually, the bar code is printed on a material by an ink jet printer and the like, and suitable for classifying and identifying the goods in a store or shop which deals with various kinds of goods.

Recently, many goods carry such bar codes. In addition, the bar code system is applied to controlling files, and the like. For example, the bar code system is applied in a mailing system in which mails are sorted by code controlling.

However, hitherto, the bar code is formed by printing black bars on a white substrate. Since this black-white bar code utilizes a difference of reflectance between the black bars and the white substrate for reading it, it has a drawback that it is hardly read when an area of a material on which the bar code is formed is stained. In addition, to read the black-white bar code, a reflected light should be in a visible wavelength region. Then, the black-white bar code may deteriorate appearance of the material carrying the bar code. For example, a bar code will damage a picture on a book cover, or a white surface of a post card.

As an improvement of a black-white bar code, a fluorescent mark, which is excited by ultraviolet ray and emits visible light, is used, or an infrared fluorescent bar code, which is excited by infrared ray and emits infrared ray, is used (Japanese Patent KOHYO Publication No. 500590/1994).

But, since the fluorescent mark which is excited by the UV ray and emits the visible light uses the visible light for reading the bar code, it still deteriorates the appearance of the material carrying the bar code. In addition, the bar code comprising such fluorescent composition is hardly read when an area of a material on which the bar code is formed is stained as in the case of the black-white bar code.

Since the infrared fluorescent bar code which is excited by infrared ray and emits infrared ray does not have the emission of the visible light, the presence of the bar code does not deteriorate the appearance of the material carrying the bar code, and the information of the bar code can be detected without significant influence by the stain on the bar code. The infrared fluorescent material comprises an infrared fluorescent dye which absorbs and emits light in an infrared wavelength range. When such dye is formulated as a marking composition and printed by an ink jet printer and the like on a substrate material having high absorbance of a liquid such as a marking ink, for example, Japanese paper, bleeding of the liquid composition, which is called as "feathering" occurs, whereby a read rate of the bar code is decreased, so that an apparatus which functions according to the information from the bar code tends to maloperate. In addition, a density of the information stored in the bar code is increasing, and a gap between adjacent bars is being decreased. Then, the feathering seems to be a fatal drawback of the bar code for increasing the information density of the bar code.

Since the conventional infrared fluorescent marking composition has a property to dye a substrate material which is an inherent property of the dye, the bar code printed by such composition is hardly read when the substrate material is one absorbing IR light, such as a black material. Further, since an organic dye contained in such marking composition has, in general, poor light and water resistance, it will be difficult to read the bar code due to fading of the bar code.

As the infrared fluorescent material, inorganic compounds comprising neodymium, yttrium, etc. may be used (cf. U.S. Pat. No. 4,202,491, Japanese Patent KOKAI Publication No. 9607/1978 and Japanese Patent Publication No. 22326/1979). However, since the inorganic fluorescent material has a long rise time to emit infrared light and long afterglow, an output from one mark overlaps an output from an adjacent mark when the marks are read at a high read rate, so that each mark cannot be identified.

SUMMARY OF THE INVENTION

One object of the present invention is to provide a fluorescent marking composition which does not bleed, and is excellent in dispersion stability, light resistance, heat resistance and water resistance.

Another object of the present invention is to provide a fluorescent marking composition which forms a readable fluorescent mark even on a substrate material which absorbs IR light, and a bar code suitable for increasing a density of information stored therein.

A further object of the present invention is to provide a fluorescent marking composition for an ink jet printer, which composition has good shelf stability with no precipitation and does not suffer from agglomeration of components, and has good redispersibility after it is dried to a solid.

A yet further object of the present invention is to provide a fluorescent mark formed by printing a fluorescent marking composition without bleeding, and having excellent light resistance, heat resistance and water resistance.

According to a first aspect of the present invention, there is provided a fluorescent marking composition comprising particles of an organic material having a glass transition temperature of at least 30° C. and an average particle size of at least 30 nm, and emitting fluorescence in a visible light range.

According to a second aspect of the present invention, there is provided an infrared fluorescent marking composition comprising particles of an organic material having a glass transition temperature of at least 30° C. and an average particle size of at least 30 nm, and absorbing infrared light having a wavelength of at least 700 nm and emitting a light in an infrared wavelength range.

In a preferred embodiment, the marking composition of the present invention is used in an ink jet printer, and a ratio of a viscosity (mPa.s) of the composition to a nozzle diameter ($\mu$m) of the printer is from 0.01 to 1. The composition having a Reyolds number of from 10.5 to 2100, a Weber number of from 38.2 to 3360, or the ratio of the viscosity (mPa.s) of the composition to a surface tension (mN/m) of the composition is from 0.03 to 1.0.

Accodeing to a third aspect of the present invention, there is provided a fluorescent mark comprising particles of an organic material having a glass transition temperature of at least 30° C. and an average particle size of at least 30 nm, and emitting fluorescence in a visible light range.

According to a fourth aspect of the present invention, there is provided an infrared fluorescent mark comprising particles of an organic material having a glass transition temperature of at least 30° C. and an average particle size of at least 30 nm, and absorbing infrared light having a wavelength of at least 700 nm. Preferably, this mark has a rise time of 10 μsec. or less from 10% to 90% of the maximum light emitting output when infrared light is irradiated on the mark.

DETAILED DESCRIPTION OF THE INVENTION

According to the present invention, the fluorescent marking composition comprises particles of an organic material which has a glass transition temperature of at least 30° C. and an average particle size of at least 30 nm.

When the marking composition comprising the organic particles having the glass transition of at least 30° C. is printed by, for example, an ink jet printer, a printed mark has good stability, and the printed composition has good heat resistance, so that it can be heated up to about 40° C. to accelerate drying of the marking composition.

When the marking composition is heated up to about 30° C. in the ink jet printer, or stored in a summer season, the organic particles tend to have stickiness due to properties of the raw material, so that the composition tends to form agglomeration. Since the organic particles maintain stickiness after the formation of the mark or image, the mark or image may be transferred to a material to which the mark is contacted, for example, when the mark is formed on a sheet of paper.

According to the present invention, since the organic particles have a glass transition temperature of at least 30° C., the marking composition has good storage stability and heat resistance, and then the viscosity of the composition does not increase, and the formed mark is not transferred, even when the temperature of the composition is raised.

Preferably, the organic particles have the glass transition temperature of from 30° C. to 400° C., more preferably from 30° C. to 350° C.

When the organic particles have the average particle size of at least 30 nm, they have substantially the same dispersion stability as a dye in the composition and provide a sufficient print concentration. When the average particle size is 30 nm or larger, the particles can include a fluorescent colorant therein, whereby bleeding of the marking composition can be suppressed.

When the average particle size is 30 nm or larger, control of the particle size is easy in a production process. In addition, since the marking composition is required to have redispersibility when it is used in the ink jet printer, it is necessary for the composition not to form any film. Since the marking composition of the present invention comprising the organic particles has good wettability with a solvent, it has good redispersibility.

According to the study by the present inventors, since a hiding property is improved as the particle size of the organic particles increases, the formed mark is made clearer as the particle size increases. For general applications, the average particle size is preferably from 30 nm to 2 μm, more preferably from 30 nm to 0.8 μm.

When the organic particles have the average particle size of at least 30 nm and the glass transition of at least 30° C., the marking composition is excellent in heat stability and redispersibility, and forms a mark which is not or hardly transferred.

Among the organic material particles, hollow particles are preferred. Since the hollow particles include a solvent therein, their specific gravity does not increase when the particle size is increased. When a concentration of the particles in the composition is increased, the composition does not form any film, and has good redispersibility. In addition, after printing, the hollow particles can increase the hiding property, since each panicle has different refractive indexes between the particle surface and the inside.

When the organic particles, at least a part of which may be hollow particles, having the average particle size of at least 30 nm and the glass transition of at least 30° C. is used in combination with a fluorescent dye and/or a fluorescent brightening agent, a marking composition comprising the organic particles having the average particle size of at least 30 nm and the glass transition of at least 30° C., and emitting a fluorescence in the visible light range, which is excellent in heat resistance and dispersion stability, does not bleed, and has excellent light and heat resistance.

When the organic material particles having the average particle size of at least 30 μm and the glass transition temperature of at least 30° C. are treated together with the fluorescent dye and/or the fluorescent brightening agent by a bulk resin grinding method, an emulsion polymerization method, a resin precipitation method, etc., the free coloring dye is trapped in the organic particles and firmly bonded thereto to form a fluorescent organic pigment which maintains the properties of the fluorescent dye and/or the fluorescent brightening agent. Using such fluorescent organic pigment, the fluorescent marking composition can be formulated.

The fluorescent marking composition comprising such fluorescent organic pigment has properties of a pigment. Different from the fluorescent dye, the composition does not bleed when it is applied on the substrate material such as a sheet of paper to form a mark, is excellent in dispersion stability, light and heat resistance, and has good coloring properties. In addition, it can provide a hiding property to the composition since it is a pigment, and makes the composition less susceptible to a kind of the substrate material on which the mark is formed.

In the bulk resin grinding method, the fluorescent dye and/or the fluorescent brightening agent are/is melt mixed with the organic particles and cooled, and then the solidified mixture is ground. In the emulsion polymerization method, the fluorescent dye and/or the fluorescent brightening agent are/is absorbed on the organic material particles or hollow particles which are produced by emulsion polymerization in a suspension to dye the particles. In the resin precipitation method, an aqueous solution of a metal salt is added to an aqueous mixture of the organic material particles and the fluorescent dye and/or the fluorescent brightening agent, optionally, the mixture is acidified, and the organic particles carrying the absorbed fluorescent dye and/or the fluorescent brightening agent are precipitated in the form of a metal salt, followed by recovering the particles by, for example, filtration and drying them.

Preferred examples of the organic particles having the glass transition temperature of at least 30° C. and the average particle size of at least 30 nm are particles of polymethacrylate, polyacrylate, polyvinyl chloride, benzoguanamine resin, alkyd resin, urea resin, vinyl chloride, vinyl acetate copolymer, aromatic sulfonamide resin. Specific examples of the organic particles are MICROGEL of Nippon Paint Co., Ltd., ACRYL EMULSION of Rohm & Haas, organic fine particles supplied by Nippon Synthetic Rubber Co., Ltd., CHEMIPEARL of Mitsui Petrochemical Co., Ltd., and so on.

Preferred examples of the hollow particles are hollow particles of polymethacrylate, polyacrylate, and so on. Specific examples of the hollow particles are SX 863 (A), SX 864 (B) (both manufactured by Mippon Kayaku Co., Ltd.), OP-62, OP-84J (both manufactured by Rohm & Haas), and so on.

Specific examples of the hollow particles are hollow particles supplied by Nippon Synthetic Rubber Co., Ltd., hollow particles supplied by Rohm & Haas, and so on.

As the fluorescent dye to be used in combination with the above organic particles or used for the preparation of the above fluorescent organic pigment, any fluorescent dye may be used. Preferred examples of the dye are acid dyes, substantive dyes, cationic dyes, mordant dyes, acid mordant dyes, disperse dyes, reactive dyes, oxidation dyes, and the like.

The fluorescent brightening agent is used as such or in combination with the above fluorescent dye.

Specific examples of the fluorescent dye are ACID YELLOW 3, ACID YELLOW 7, ACID RED 52, ACID RED 77, ACID RED 87, ACID RED 92, ACID BLUE 9, BASIC YELLOW 1, BASIC YELLOW 40, BASIC RED 1, BASIC RED 13, BASIC VIOLET 7, BASIC VIOLET 10, BASIC ORANGE 22, BASIC BLUE 7, BASIC GREEN 1, DISPERSE YELLOW 121, DISPERSE YELLOW 82, DISPERSE ORANGE 11, DISPERSE RED 58, DISPERSE BLUE 7, DIRECT YELLOW 85, DIRECT ORANGE 8, DIRECT RED 9, DIRECT BLUE 22, DIRECT GREEN 6, FLUORESCENT BRIGHTENING AGENT 55, FLUORESCENT BRIGHTENING WHITEX WS 52, FLUORESCENT 162, FLUORESCENT 112, SOLVENT YELLOW 44, SOLVENT RED 49, SOLVENT BLUE 5, SOLVENT PINK, SOLVENT GREEN 7, PIGMENT BLUE 15, PIGMENT GREEN 7, PIGMENT RED 53, PIGMENT RED 57, PIGMENT YELLOW 1, and the like.

Specific examples of the fluorescent brightening agent are Fluorescent Brightening Agents 85, 86, 22, 174, 166, 90, 134, 84, 24, 87, 175, 176, 169, 167, 173, 14, 32, 30, 177, 153, 168, 37, 10 104, 45, 55, 52, 54, 56, 171, 170, 135, 162, 163, 164, 112, 121, 172, 91, and the like.

When the fluorescent organic pigment is prepared, an amount of the fluorescent dye and/or the fluorescent brightening agent to be bound with the organic particles or hollow particles is preferably from 0.001 to 10 wt. % based on the weight of the organic particles. When the amount of the fluorescent dye and/or the fluorescent brightening agent is less than 0.001 wt. % or larger than 10 wt. %, sufficient fluorescence is not obtained.

When the organic material particles having the average particle size of at least 30 nm and the glass transition temperature of at least 30° C. are treated together with the organic dye which emits fluorescence in the infrared wavelength range of at least 700 nm and/or the fluorescent brightening agent by a bulk resin grinding method, an emulsion polymerization method, a resin precipitation method, etc., the free organic dye and/or the fluorescent brightening agent are/is trapped in the organic particles and firmly bonded thereto to form an infrared fluorescent organic pigment which maintains the properties of the organic dye and/or the fluorescent brightening agent. Using such infrared fluorescent organic pigment, the infrared fluorescent marking composition can be formulated. This composition is excellent in dispersion stability, water and light resistance, coloring, etc., and does not bleed on a sheet of paper. Further, because of the property of the pigment, the formed mark has a good hiding property, and is less influenced by the properties of the substrate.

As the organic dye which emits a fluorescence in the infrared wavelength range of at least 700 nm, any kind of organic dyes may be used. Preferred examples of the organic dye are polymethine dyes, anthraquinone dyes, dithiol metal salt dyes, phthalocyanine dyes, indophenol dyes, aminium dyes, diimonium dyes, azo dyes, and the like. Among them, the polymethine dyes are more preferred in view of their weatherability. As the fluorescent brightening agent, one used in the above fluorescent marking composition can be used.

The infrared fluorescent marking composition may optionally contain a color dye.

Specific examples of the polymethine dye are IR-140 (manufactured by KODAK Laboratories Chemicals), IR-820B (manufactured by Nippon Kayaku Co., Ltd.), and so on. Specific examples of the anthraquinone dye are IR-750 (manufactured by Nippon Kayaku Co., Ltd.), and so on. Specific examples of the dithiol metal salt dye are tetrabutylphosphonium (1,2-benzenethiorate) nicolate (III) (manufactured by Mitsui Toatsu Co., Ltd.), and so on. Specific examples of the phthalocyanine dye are Zn-phthalocyanine, and so on. Specific examples of the fluorescent brightening agent are MIKAWHITE ACR, Kayapor 3BS (both manufactured by Nippon Kayaku Co., Ltd.), and so on.

In the preparation of the infrared fluorescent organic pigment, an amount of the organic dye and/or the fluorescent brightening agent which emit fluorescence in the infrared wavelength range of at least 700 nm and are/or bound to the organic particles or hollow particles is from 0.001 to 15 wt. % based on the weight of the organic particles. When this amount is less than 0.001 wt. %, neither sufficient color nor sufficient fluorescence emission is achieved. When it is too large, a degree of coloring is too high, so that concentration quenching occurs so that no fluorescence is emitted.

The marking composition of the present invention may be prepared by a per se conventional method. That is, the organic particles or hollow particles are mixed with the fluorescent dye and/or the fluorescent brightening agent and/or a colorant, or with the organic dye and/or the fluorescent brightening agent which absorb infrared light having a wavelength of at least 700 nm and/or the colorant, together with a binding resin, optionally in the presence of a solvent.

In addition to or in place of the solid organic particles, the hollow particles may be used.

As the binder resin, any of conventionally used resins may be used. Examples of the binder resin are polyvinyl alcohol, acrylic resin, polyethylene oxide, starch, naphthalenesulfate salt-formalin condensate, carboxymethylcellulose, and the like.

Examples of the optional solvent are water, alcohols, ketones, esters, ethers, aromatic hydrocarbons, aliphatic hydrocarbons, etc. They may be used independently or as a mixture thereof.

The fluorescent or infrared fluorescent marking composition of the present invention is used in an ink jet printer, or in various printing methods such as screen printing, offset printing, gravure printing, letterpress printing, padding printing, and so on. According to the type of the printing method, the marking composition may contain any of conventional additives such as a dispersant, a defoamer, a surfactant, a moisture-preservative, an electrical conductivity imparting agent, and the like.

In the case of the fluorescent or infrared fluorescent marking composition for the ink jet printer, preferably the ratio of the viscosity (mPa.s) of the composition to the nozzle diameter ($\mu$m) of the ink jet printer is from 0.01 to 1, the Reynolds number is from 10.5 to 2100, the Weber number is from 38.2 to 3360, and the ratio of a viscosity (mPa.s) of the composition to a surface tension (mN/m) of the composition is from 0.03 to 1.0. In particular, when the ratio of the viscosity to the nozzle diameter is from 0.03 to 1, a good mark is formed.

The main principle of ink jet printing is assumed to be the formation of a droplet due to burst of an jet stream and electromagnetic control of a flying direction of the droplet.

The formation of the droplet is expressed by the Rayleigh's equation of motion, and optimum fluid mechanical properties are obtained from a solution of the equation, and derived as a combination of dimensionless numbers from designing conditions of an equipment (A. Kinoshita, Prepublished Texts for the Printing-information Recording Forum (1987)). Several dimensionless numbers are known. Among them, the Reynolds number and the Weber number relate to an ink or a marking composition.

Then, the Reynolds number has been studied in connection with the marking composition of the present invention.

The Reynolds number Re is expressed by the equation:

$$Re = \rho v d \eta^{-1}$$

in which $\rho$ is a density of a liquid (g/cm$^3$), v is a velocity (m/sec.), d is a nozzle diameter ($\mu$m), and n is a coefficient of viscosity (mPa.s).

When conditions under which a droplet can be formed and the composition flows are represented by the Reynolds number, the Reynolds number should be in the range between 10.5 and 2100 with the marking composition of the present invention. When the Reynolds number is outside this range, satellite droplets, which are smaller droplets other than the main droplet, are irregularly formed, and the composition is splashed, so that a desired image is not printed.

Figure 1:
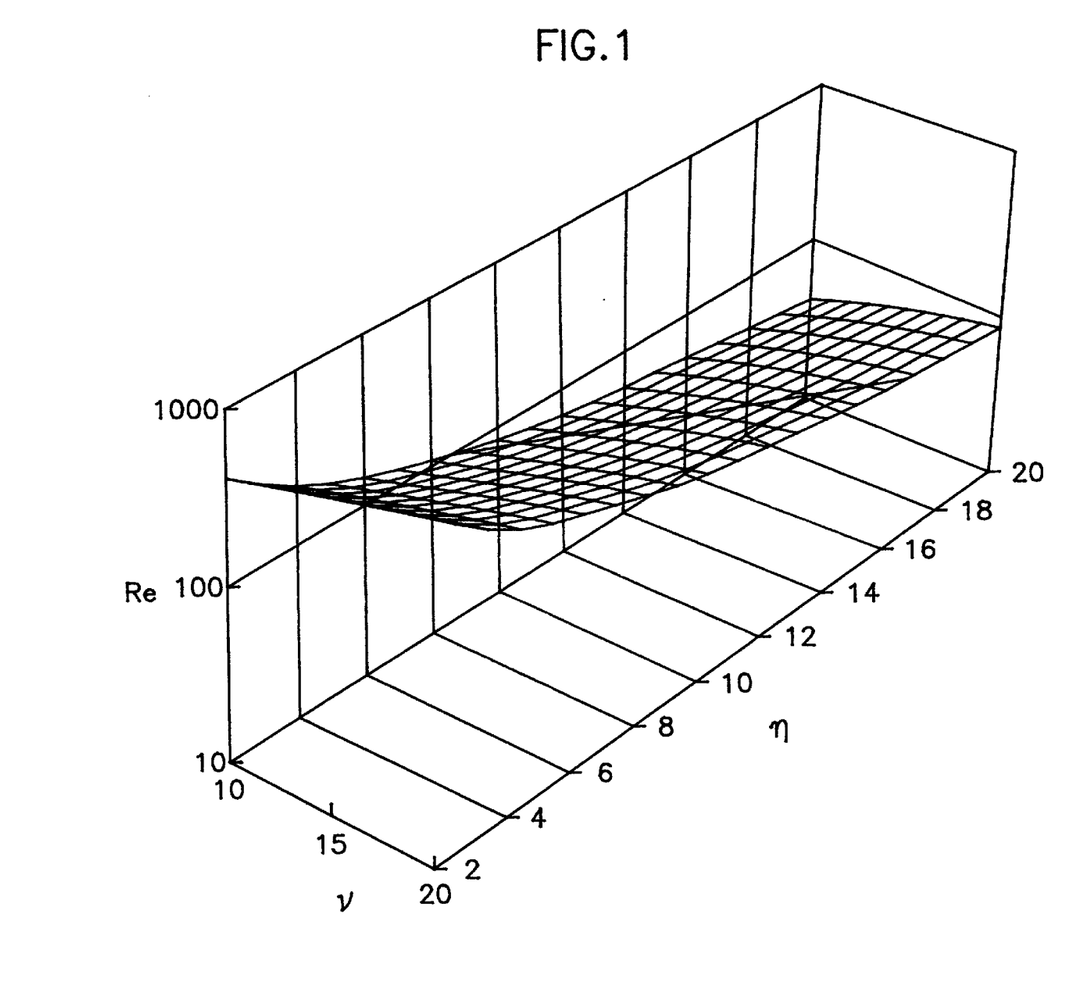
FIG. 1 is a graph of the Reynolds number in relation to a velocity (v) and a viscosity (η).

With varying the nozzle diameter of the ink jet printer, the bar codes were printed and reading of the outputs from the bar codes was tested, and it was found that, when the nozzle diameter was 80 $\mu$m, a clearest image was formed, and the output is increased. Then, the printing test was carried out with fixing the nozzle diameter at 80 m and varying the velocity and the viscosity, the velocity could be changed from 10 to 20 m/sec., and the viscosity was changed from 2 to 20 mPa.s. These results are shown by a curved plane in FIG. 1. In this case, the Reynolds number was in the range between 42 and 840.

Next, the Weber number was studied. The Weber number We is expressed by the equation:

$$We = \rho 2 v d \gamma^{-1}$$

in which $\rho$, v and d are the same as defined above, and $\gamma$ is a surface tension (mN/m).

With the marking composition of the present invention, the Weber number should be in the range between 38.2 and 3360 in view of the formation of droplets of the marking composition, and foaming. Outside this range, the composition was heavily foamed, so that no printing was possible or any desired image was printed if the printing was possible.

Figure 2:
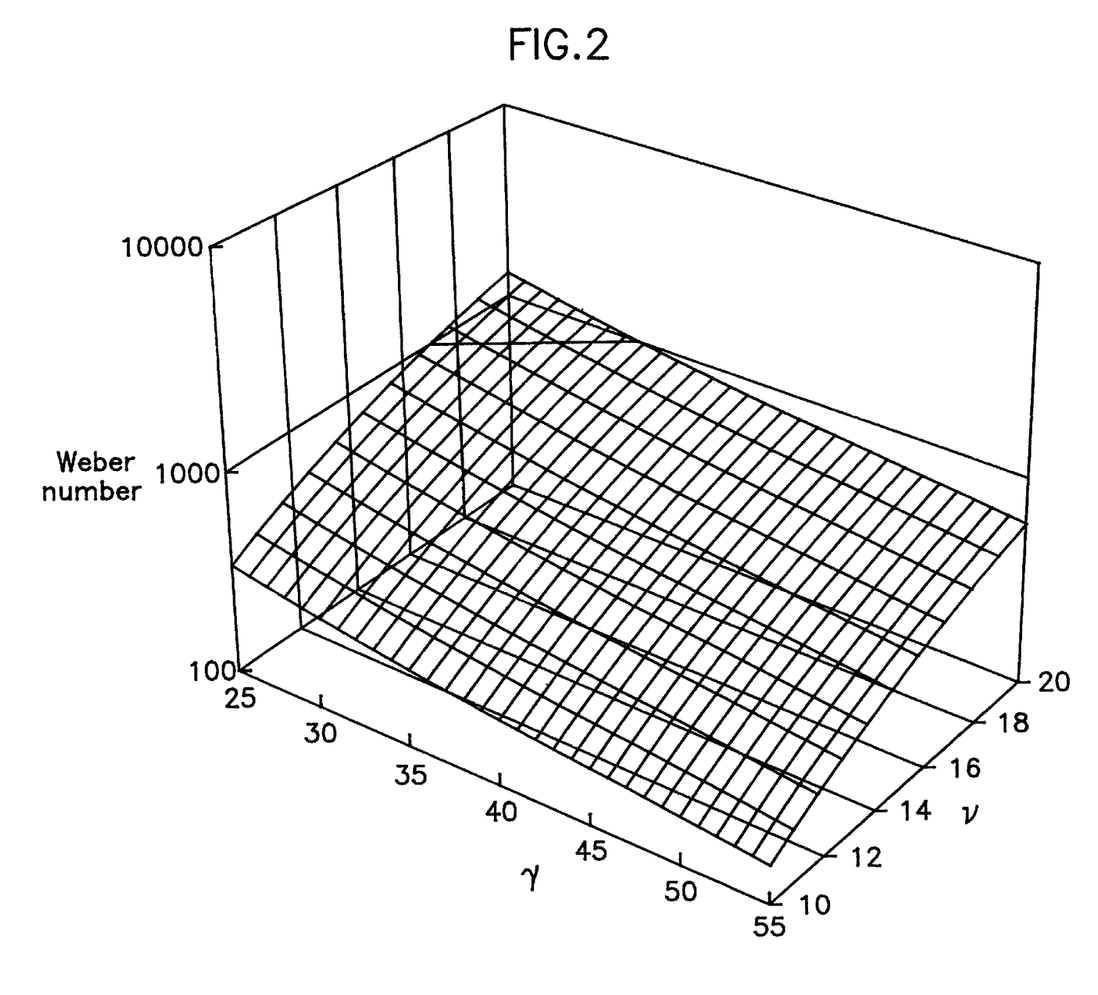
FIG. 2 is a graph of the Weber number in relation to a surface tension (γ) and a velocity (v).

When the nozzle diameter was fixed at 80 $\mu$m as in the case of the Reynolds number, the velocity could be changed from 10 to 20 m/sec. and the surface tension could be changed from 25 to 55 mN/m. These results are shown in FIG. 2. From FIG. 2, it is understood that the weber number can be changed from 152 to 1360.8.

When the ink or the marking composition is printed by injecting it by the ink jet printer, a degree of bubbling is not determined only by the surface energy, but the viscosity and the surface tension should be taken into account. With the marking composition of the present invention, the good printing was possible, when the ratio of the viscosity (mPa.s) to the surface tension (mN/m) was in the range between 0.03 and 1.0. Then, to use the marking composition of the present invention in the ink jet printer, the ratio of the viscosity (mPa.s) to the surface tension (mN/m) is preferably in the range between 0.03 and 1.0. Further, when the marking composition is printed by the ink jet printer, the formation of droplets is not a function of the flow rate, but a relationship between the viscosity and the nozzle diameter should be taken into account. In the case of the marking composition of the present invention, good printing is possible when a ratio of the viscosity (mPa.S) to the nozzle diameter ($\mu$m) is in the range between 0.01 and 1.0.

The fluorescent mark formed from the fluorescent marking composition or the infrared fluorescent marking composition of the present invention emits the fluorescence in the visible light range, or absorbs the IR light having the wavelength of at least 700 nm and emits light in the infrared wavelength range. Since the infrared fluorescent mark which absorbs the IR light having the wavelength of at least 700 nm and emits light in the infrared wavelength range is not remarkably seen in the visible light range, it does not impair the appearance of the substrate, or is not influenced by a material or shape of the substrate, or the stain on the mark.

Figure 3:
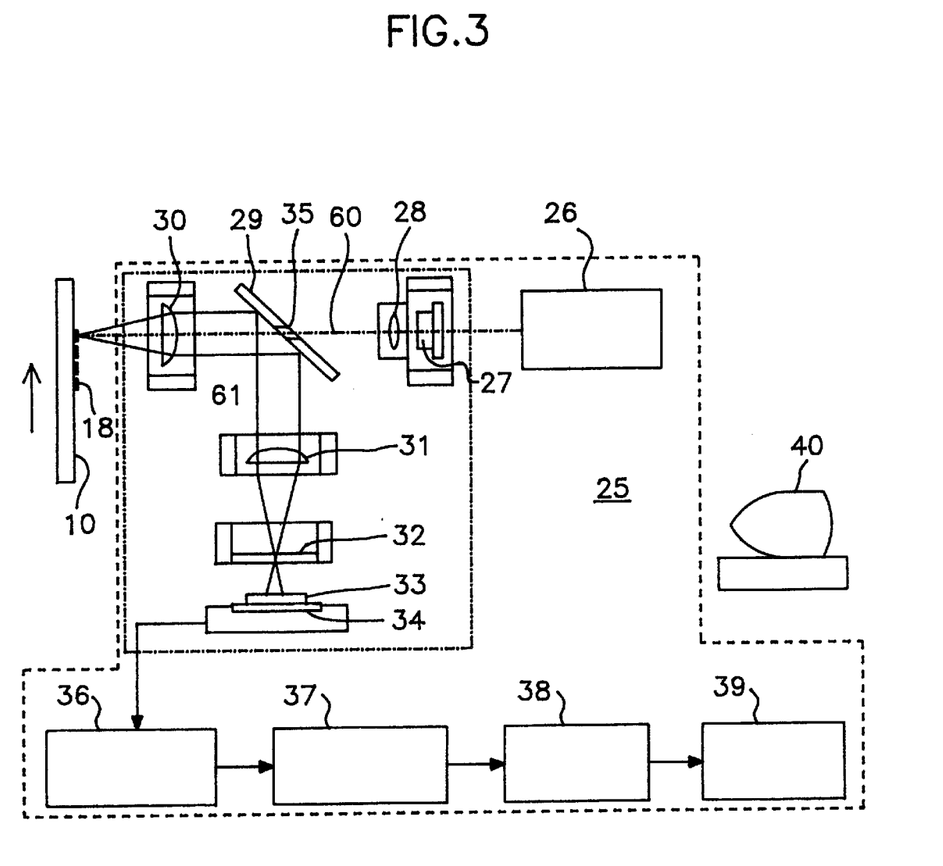
FIG. 3 schematically shows a reader of a fluorescent mark.

As a reader to be used in combination of a mark of the present invention which emits fluorescence in the infrared wavelength range, any reader which has a function for emitting the IR light and detecting the infrared fluorescence may be used. An example of the reader is shown in FIG. 3. As seen from FIG. 3, the reader has a reader optical system and a reading circuit.

The reader of FIG. 3 will be explained in detail. The reader optical system comprises a semiconductor laser driving 25 circuit 26, a semiconductor laser 27, a lens 28, a total reflection mirror 29, piano-convex lenses 30, 31, a slit 32, a filter 33, and a photodiode 34.

An excitation laser beam 60 emitted from the semiconductor laser 27 is converged to a diameter of 1 mm by the lens 28, passes through a through hole 35 formed at the center of the mirror 29, and irradiated perpendicularly onto a substrate 10 carrying the infrared fluorescent mark via the lens 30.

When the laser beam 60 is irradiated on the mirror 29 without converging, a part of the excitation laser beam 60 is cut by a peripheral part of the mirror around the above through hole 35. Thereby, an amount of the excitation laser beam 60 (excitation energy) which reaches the infrared fluorescent mark side is substantially decreased and then a luminous efficiency is decreased. Therefore, a converged diameter of the excitation laser beam 60 should be limited to less than the diameter of the through hole 35.

The infrared fluorescent mark is transferred at a high speed in a direction of an arrow, during which the mark is irradiated by the laser beam, whereby the infrared fluorescent material is excited. The generated fluorescence is received by the first plane-concave lens 30. The received light is reflected on the mirror 29, converged by the second plano-convex lens 31, passed through the slit 32 and the filter 33, and received by the photodiode 34.

The reading circuit comprises a detection circuit 36 having an amplifying circuit and a filter circuit, a binary processing circuit 37, a decoding circuit 38, a serial interface 39, and a personal computer 40 for data processing.

When a mark which emits fluorescence in the infrared wavelength range of 700 nm or longer is formed on a white substrate which has a reflectance of at least 50% with the IR light having the wavelength of at least 700 nm, a ratio of $C_0$ to $C_1$ ($C_0/C_1$) is preferably 4% of less, where $C_0$ is a reflection output of the substrate (standard white. Standard White No. 1 manufactured by HYOJUN SHIKISI KENKYUSHO) and $C_1$ is an output when the IR light is irradiated on the infrared fluorescent mark. When the $C_0/C_1$ is 4% or less, a good read rate without maloperation is achieved when the printed mark is read.

When the infrared fluorescent mark of the present invention is formed on a black substrate material having a reflectance of 10% or less in relation to the IR light having a wavelength of at least 700 nm, an output from the infrared fluorescent mark measured by irradiating the IR light is expressed by "$C_2$". In the present invention, a ratio of $C_2$ to above $C_1$ ($C_2/C_1$) is preferably at least 5%. When this ratio is 5% or larger, the infrared fluorescent can be detected on the standard white substrate and the infrared fluorescent mark can be read without maloperation, and also the infrared fluorescent mark on the black substrate material can be read without difficulty.

When the $C_0/C_1$ ratio on the standard white substrate is less than 4%, a mark emitting the fluorescence in the infrared wavelength range of at least 700 nm is detected. But, when the substrate is colored, for example, the substrate is a black substrate, in particular, a substrate containing carbon black, a sufficient output cannot be obtained, so that a read error occurs to cause maloperation.

When the infrared fluorescent mark formed on the substrate is read at a high speed, a response speed from the infrared fluorescent mark should be increased. When the infrared fluorescent mark of the present invention is used, a rise time from 10% to 90% of the maximum output can be 10 μsec. or less. Then, a sufficient excited light can be obtained when the mark is read at a rate of 4 m/sec. or higher.

The infrared fluorescent mark which is formed as described above can be less influenced by the stain on the mark or the bleeding of the making composition, and also by the kind of the substrate on which the mark is formed. Accordingly, the kind of the substrate is not limited. In addition, when the infrared fluorescent mark is formed on the substrate which absorbs the IR light, it can be well read. Then, the infrared fluorescent mark of the present invention is suitable for printing a bar code having a higher density.

PREFERRED EMBODIMENTS OF THE INVENTION

The present invention will be explained further in detail by the following Examples.

In the following Examples, an ink jet printer GX-PA having a nozzle diameter of 80 μm (manufactured by Hitachi Ltd.) was used.

EXAMPLE 1

To 100 wt. parts of a dispersion of hollow particles of a styrene-acrylate copolymer (solid content: 20 wt. %. Particle size: 0.3 μm. Glass transition temperature: 30° C.), a solution of 0.3 wt. part of RODAMIN B (manufactured by Sumitomo Chemical Co., Ltd.) in 6 wt. parts of ethanol was added, stirred and mixed to obtain a pink fluorescent organic pigment.

To the pigment, 10 wt. parts of JOHNCRYL 61 (an acrylstyrene copolymer manufactured by Johnson Polymer. Solid content: 30 wt. %) and 20 wt. % of water were added and dispersed in a ball mill for 3 hours, followed by filtering through a filter of 1 μm, to obtain a marking composition. This composition had a Reynolds number of 560, a Weber number of 1018, a ratio of a viscosity to a nozzle diameter of 0.0375, and a ratio of a viscosity to a surface tension of 0.09.

Using this marking composition, characters were printed on a sheet of paper with an ink jet printer.

EXAMPLE 2

To 100 wt. parts of an emulsion polymerization solution of a styrene-acrylate copolymer (solid content: 30 wt. %. Particle size: 50 nm. Glass transition temperature: 50° C.), a solution of 0.3 wt. part of RODAMIN B (manufactured by Sumitomo Chemical Co., Ltd.) in 6 wt. parts of ethanol was added, stirred and mixed to obtain a pink fluorescent organic pigment.

To the pigment, 10 wt. parts of JOHNCRYL 61 (an acrylstyrene copolymer manufactured by Johnson Polymer. Solid content: 30 wt. %) and 20 wt. parts of water were added and dispersed in a ball mill for 3 hours, followed by filtering through a filter of 1 μm, to obtain a marking composition. This composition had a Reynolds number of 400, a Weber number of 842, a ratio of a viscosity to a nozzle diameter of 0.05, and a ratio of a viscosity to a surface tension of 0.1.

Using this marking composition, characters were printed on a sheet of paper with an ink jet printer.

EXAMPLE 3

To 100 wt. parts of an emulsion polymerization solution of a styrene-acrylate copolymer (solid content: 30 wt. %. Particle size: 50 nm. Glass transition temperature: 50° C.), a solution of 0.2 wt. part of ANTHRAZONE RED 6B (manufactured by Bayer) in 4 wt. parts of ethanol was added, stirred and mixed to obtain a pink fluorescent organic pigment.

To the pigment, 10 wt. parts of JOHNCRYL 61 (an acrylstyrene copolymer manufactured by Johnson Polymer. Solid content: 30 wt. %) and 20 wt. parts of water were added and dispersed in a ball mill for 3 hours, followed by filtering through a filter of 1 μm, to obtain a marking composition. This composition had a Reynolds number of 315, a Weber number of 473, a ratio of a viscosity to a nozzle diameter of 0.05, and a ratio of a viscosity to a surface tension of 0.1.

Using this marking composition, characters were printed on a sheet of paper with an ink jet printer.

EXAMPLE 4

To 100 wt. parts of an emulsion polymerization solution of a styrene-acrylate copolymer (solid content: 30 wt. %. Particle size: 50 nm. Glass transition temperature: 50° C.), a solution of 0.2 wt. part of SOLAR PURE YELLOW 8G (manufactured by Sumitomo Chemical Co., Ltd.) in 4 wt. parts of ethanol was added, stirred and mixed to obtain a pink fluorescent organic pigment.

To the pigment, 10 wt. parts of JOHNCRYL 61 (an acryl-styrene copolymer manufactured by Johnson Polymer. Solid content: 30 wt. %) and 20 wt. parts of water were added and dispersed in a ball mill for 3 hours, followed by filtering through a filter of 1 μm, to obtain a marking composition. This composition had a Reynolds number of 236, a Weber number of 405, a ratio of a viscosity to a nozzle diameter of 0.067, and a ratio of a viscosity to a surface tension of 0.11.

Using this marking composition, characters were printed on a sheet of paper with an ink jet printer.

EXAMPLE 5

To 100 wt. parts of an emulsion polymerization solution of a styrene-acrylate copolymer (solid content: 30 wt. %. Particle size: 30 nm. Glass transition temperature: 40° C.), a solution of 0.15 wt. part of IR-820 (a polymethine dye manufactured by Nippon Kayaku Co., Ltd. A wavelength peak of absorbing light: 820 nm. A wavelength peak of emitting light: 900 nm) in 5 wt. parts of acetone was added, stirred and mixed to obtain an infrared fluorescent organic pigment.

To the pigment, 10 wt. parts of JOHNCRYL 61 (an acrylstyrene copolymer manufactured by Johnson Polymer. Solid content: 30 wt. %) and 10 wt. parts of water were added and dispersed in a ball mill for 3 hours, followed by filtering through a filter of 1 μm, to obtain a marking composition. This composition had a Reynolds number of 475, a Weber number of 1008, a ratio of a viscosity to a nozzle diameter of 0.0438, and a ratio of a viscosity to a surface tension of 0.11.

Using this marking composition, bar codes were printed on a sheet of Japanese paper, which was separated in two parts having a reflectance of 70% and 5%, respectively against IR light of 800 nm, with an ink jet printer.

EXAMPLE 6

To 100 wt. parts of an emulsion polymerization solution of a styrene-acrylate copolymer (solid content: 30 wt. %. Particle size: 40 nm. Glass transition temperature: 40° C.), a solution of 0.1 wt. part of IR-140 (a polymethine dye manufactured by Kodak Laboratories Chemicals. A wavelength peak of absorbing light: 826 nm. A wavelength peak of emitting light: 870 nm) in 5 wt. parts of dimethylsulfoxide was added, stirred and mixed to obtain an infrared fluorescent organic pigment.

To the pigment, 10 wt. parts of JOHNCRYL 61 (an acrylstyrene copolymer manufactured by Johnson Polymer. Solid content: 30 wt. %) and 10 wt. parts of water were added and dispersed in a ball mill for 3 hours, followed by filtering through a filter of 1 μm, to obtain a marking composition. This composition had a Reynolds number of 216.3, a Weber number of 463.5, a ratio of a viscosity to a nozzle diameter of 0.0714, and a ratio of a viscosity to a surface tension of 0.14.

Using this marking composition, bar codes were printed on a sheet of Japanese paper, which was separated in two parts having a reflectance of 60% and 3%, respectively against IR light of 800 nm, with an ink jet printer.

EXAMPLE 7

To 100 wt. parts of an emulsion polymerization solution of a styrene-acrylate copolymer (solid content: 30 wt. %. Particle size: 30 nm. Glass transition temperature: 40° C.), a solution of 0.15 wt. part of IR-820 (a polymethine dye manufactured by Nippon Kayaku Co., Ltd. A wavelength peak of absorbing light: 820 nm. A wavelength peak of emitting light: 900 nm) in 5 wt. parts of acetone was added, stirred and mixed to obtain an infrared fluorescent organic pigment.

To the pigment, 10 wt. parts of JOHNCRYL 61 (an acryl-styrene copolymer manufactured by Johnson Polymer. Solid content: 30 wt. %) and 10 wt. parts of water were added and dispersed in a ball mill for 3 hours, followed by filtering through a filter of 1 μm, to obtain a marking composition. This composition had a Reynolds number of 288, a Weber number of 721, a ratio of a viscosity to a nozzle diameter of 0.0714, and a ratio of a viscosity to a surface tension of 0.13.

Using this marking composition, characters were printed on a sheet of Japanese paper, which was separated in two parts having a reflectance of 70% and 5%, respectively against IR light of 800 nm, with an ink jet printer.

COMPARATIVE EXAMPLE 1

To 100 wt. parts of an emulsion polymerization solution of particulate styrene-acrylate copolymer (solid content: 20 wt. %. Particle size: 20 nm. Glass transition temperature: 40° C.), a solution of 0.15 wt. part of RODAMIN B (manufactured by Sumitomo Chemical Co., Ltd.) in 4 wt. parts of acetone was added to obtain a red fluorescent organic pigment.

To the pigment, 20 wt. parts of water was added and dispersed in a ball mill for 3 hours, followed by filtering through a filter of 1 μm, to obtain a marking composition.

Using this marking composition, characters were printed on a sheet of paper with an ink jet printer.

COMPARATIVE EXAMPLE 2

To 100 wt. parts of an emulsion polymerization solution of a polybutyl acrylate (solid content: 30 wt. %. Particle size: 3 μm. Glass transition temperature: 30° C. or lower), a solution of 0.3 wt. part of ANTHRAZONE RED 6B (manufactured by Sumitomo Chemical Co., Ltd.) in 6 wt. parts of acetone was added to obtain a yellow fluorescent organic pigment.

To the pigment, 20 wt. parts of water was added and dispersed in a ball mill for 3 hours, followed by filtering through a filter of 5 μm, to obtain a marking composition.

Using this marking composition, characters were printed on a sheet of paper with an ink jet printer.

COMPARATIVE EXAMPLE 3

Two wt. parts of RODAMIN B (manufactured by Sumitomo Chemical Co., Ltd.), 90 wt. parts of water, 15 wt. parts of glycerin and 15 wt. parts of ethylene glycol were mixed with stirring and filtered through a filter of 1 μm to obtain an marking composition.

Using this marking composition, characters were printed on a sheet of paper with an ink jet printer.

COMPARATIVE EXAMPLE 4

A solution of 0.15 wt. part of IR 820 B (a polymethine dye manufactured by Nippon Kayaku Co., Ltd. A wavelength peak of absorbing light: 820 nm. A wavelength peak of emitting light: 900 nm) in 2 wt. parts of acetone was added to a mixture of 30 wt. parts of JOHNCRYL 61 (an acryl-styrene copolymer manufactured by Johnson Polymer. Solid content: 30 wt. %) and 90 wt. parts of water while stirring to obtain a marking composition.

Using this marking composition, bar codes were printed on a sheet of Japanese paper, which was separated in two parts having a reflectance of 70% and 5%, respectively against IR light of 800 nm, with an ink jet printer.

COMPARATIVE EXAMPLE 5

A solution of 0.05 wt. part of IR 140 (a polymethine dye manufactured by Kodak Laboratories Chemicals. A wavelength peak of absorbing light: 826 nm. A wavelength peak of emitting light: 870 nm) in 5 wt. parts of dimethylsulfoxide was added to a mixture of 30 wt. parts of JOHNCRYL 61 (an acryl-styrene copolymer manufactured by Johnson Polymer. Solid content: 30 wt. %) and 90 wt. parts of water while stirring to obtain a marking composition.

Using this marking composition, bar codes were printed on a sheet of Japanese paper, which was separated in two parts having a reflectance of 60% and 3%, respectively against IR light of 800 nm, with an ink jet printer.

COMPARATIVE EXAMPLE 6

Eight wt. parts of an inorganic fluorescent material $LiNd_{0.5}Yb_{0.5}P_4O_{12}$ and 6 wt. parts of JOHNCRYL 61 (an acryl-styrene copolymer manufactured by Johnson Polymer. Solid content: 30 wt. %) were dispersed in 40 wt. parts of water in a ball mill to obtain a marking ink.

Using this marking composition, bar codes were printed on a sheet of Japanese paper, which was separated in two parts having a reflectance of 70% and 5%, respectively against IR light of 800 nm, with an ink jet printer.

With each of the marking compositions of Examples 1–3 and Comparative Examples 1–3 and the printed paper sheets, shelf stability, light resistance, bleeding, redispersibility and transfer property were evaluated by the following methods.

A glass transition temperature of organic particles was measured using a differential scanning calorimeter (DSC-7 manufactured by Perkin-Elmer) by heating a sample, which was prepared by drying and solidifying a solution of the organic particles at 80° C. for 24 hours, from –20° C. at a heating rate of 5° C./min.

Shelf Stability

Each marking composition was maintained in a constant temperature furnace at 50° C. for 100 hours, and a degree of sedimentation of the fluorescent pigment was checked and ranked as "O" when no sedimentation of the pigment was observed, or "X" when the pigment was precipitated.

Light resistance

Each printed paper sheet was irradiated by a fadeometer for 5 hours. Then, a degree of discoloring was examined by naked eyes and ranked as "O" when no discoloring was observed, or "X" when the discoloring was observed.

Bleeding

The presence of bleeding was observed on each of the printed paper sheet, and ranked "O" when no bleeding was present, or "X" when the bleeding was present.

Redispersibility

Each marking composition was dropped on a PET film and dried to solidify at room temperature for 24 hours. On the solidified composition, an alkaline water having pH of 11 was dropped. When the composition was redissolved, it was ranked as "O", while when the composition was not redissolved, it was ranked as "X".

Transfer test

Twenty sheets of the printed paper obtained in each Example were stacked. The stacked sheets were loaded by a weight of 5 kg and maintained at 30° C. for 600 hours. When no transfer of the printed mark occurred, the composition was ranked as "O", while the mark was transferred, the composition was ranked as "X".

All the results are shown in Table 1.

TABLE 1

| Ex. No. | Shelf stability | Light stability | Bleeding | Redispersibility | Transfer |
|---------|-----------------|-----------------|----------|------------------|----------|
| Ex. 1   | O | O | O | O | O |
| Ex. 2   | O | O | O | O | O |
| Ex. 3   | O | O | O | O | O |
| Ex. 4   | O | O | O | O | O |
| C. Ex. 1 | O | O | X | X | O |
| C. Ex. 2 | X | O | O | O | X |
| C. Ex. 3 | O | X | X | O | O |

As seen from the results in Table 1, the marking compositions comprising the fluorescence organic pigments prepared in Examples 1–4 had good dispersibility, and the printed characters using the marking compositions of Examples 1–4 had less bleeding, and better light and water resistance than the characters printed using the fluorescent dyes of Comparative Examples 1–3.

Figure 4:
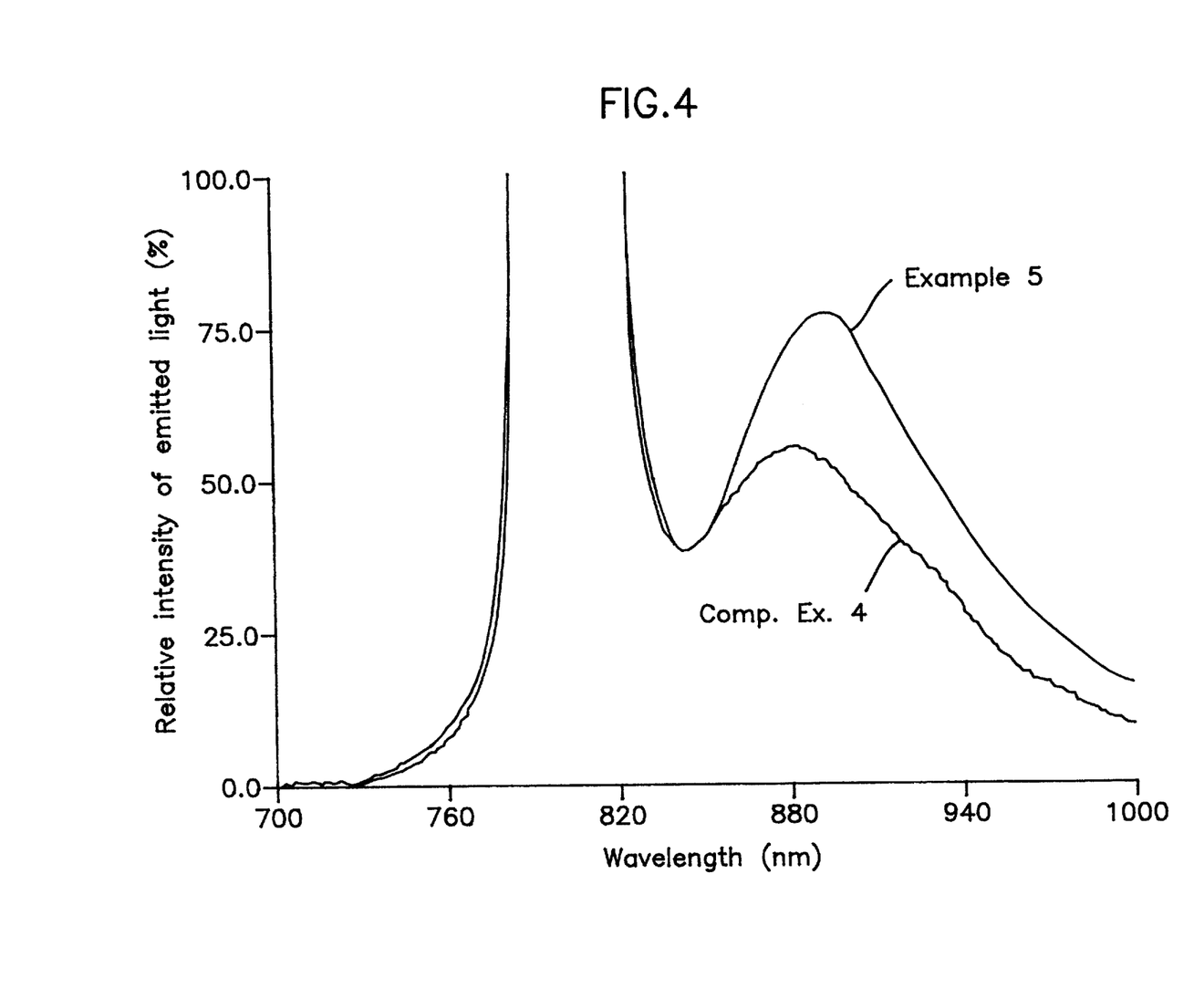
FIG. 4 is a graph showing a relative intensity of emitted light in Example 5 and Comparative Example 5.
Figure 5:
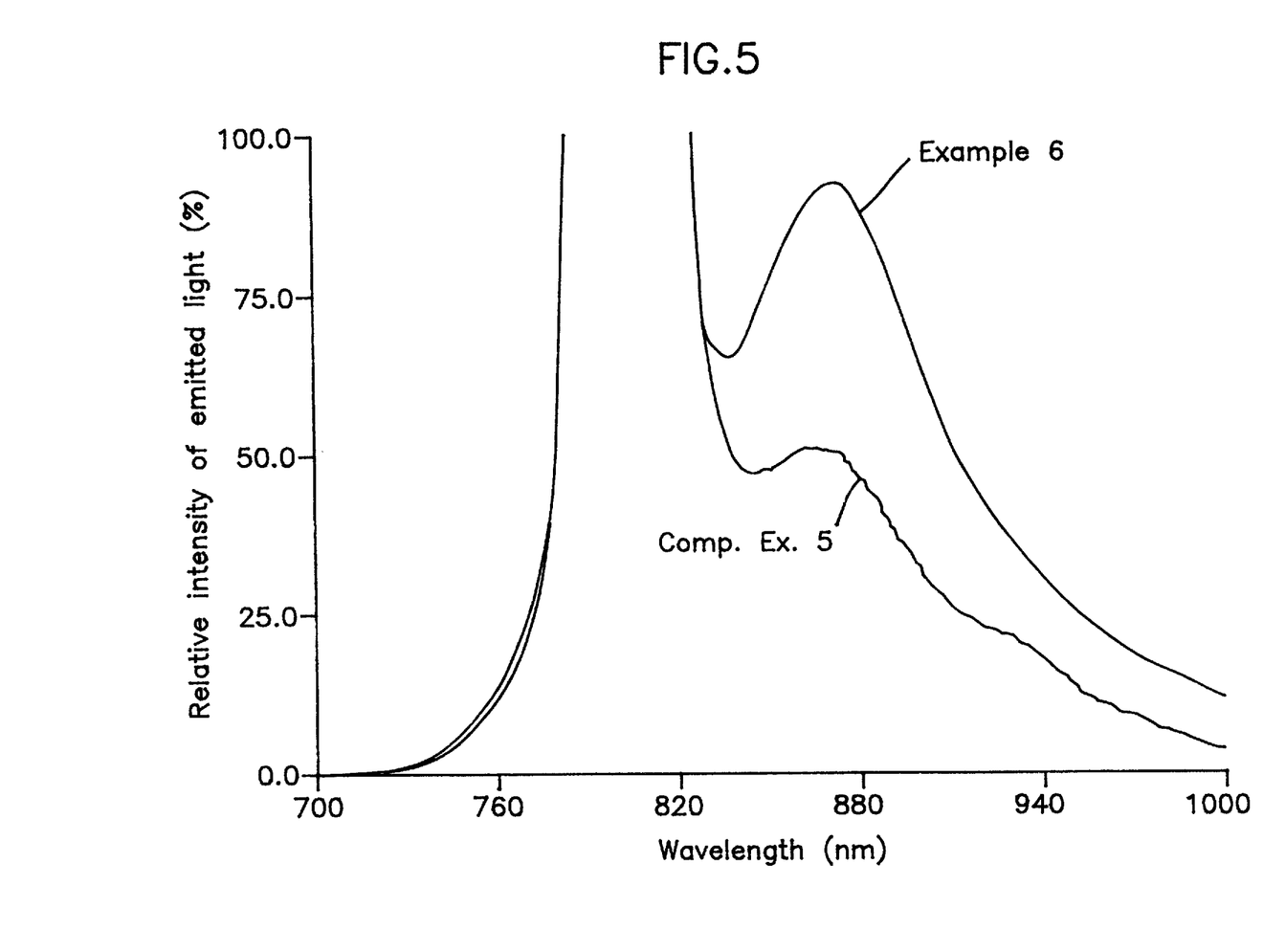
FIG. 5 is a graph showing a relative intensity of emitted light in Example 6 and Comparative Example 6.

Emission spectra from the printed surfaces of the printed paper sheets obtained in Examples 5 and 6 and Comparative Examples 4 and 5 were measured with a spectrometer (manufactured by UNISOKU) and are shown in FIGS. 4 and 5.

As seen from the spectra of FIGS. 4 and 5, the pigments maintains the property of the infrared fluorescent dyes, while the spectra of the former shifted to the longer wavelength side by several ten nm from those of the latter.

With the bar code printed on the sheet of the Japanese paper in each of Examples 5–7 and Comparative Examples 4 and 5, the reflection output of the substrate paper, and the output of the infrared fluorescent mark of the bar code were measured with a reader of FIG. 3 under the high speed reading condition of 4 m/sec.

In this measurement, the reflection output from the part of the paper sheet having the reflectance of 50% was used as $C_0$, the output from the infrared fluorescent mark formed on the part of the paper sheet having the reflectance of 50% was used as $C_1$, and the output from the infrared fluorescent mark formed on the part of the paper sheet having the reflectance of 10% was used as $C_2$. Then, a ratio of $C_0$ to $C_1$ and a ratio of $C_2$ to $C_1$ were calculated.

With 100 samples of each bar code, the bar code was read. When the read rate was 95% or higher, the composition was ranked as "O", while it was less than 95%, the composition was ranked "X".

Further, the printed mark was observed. When no bleeding was observed, the composition was ranked "O", while when the bleeding was observed, the composition was ranked "X".

The results are shown in the Table 2.

TABLE 2

| Ex. No. | Bleeding | $C_0/C_1$ (%) | $C_2/C_1$ (%) | Read rate |
|---------|----------|---------------|---------------|-----------|
| Ex. 5   | ○        | 2.5           | 15            | ○         |
| Ex. 6   | ○        | 2.5           | 10            | ○         |
| Ex. 7   | ○        | 2.8           | 9             | ○         |
| C. Ex. 4| X        | 2.4           | 0             | X         |
| C. Ex. 5| X        | 2.6           | 0             | X         |
| C. Ex. 6| ○        | 2.0           | 10            | X         |

As seen from the results in Table 2, the infrared fluorescent marks consisting of the bar codes printed on the Japanese paper sheet according to the present invention (Examples 5, 6 and 7) had no bleeding and the high read rate in comparison with the conventional infrared fluorescent marks consisting of the bar codes printed on the Japanese paper sheet (Comparative Examples 4 and 5).

The infrared fluorescent marking compositions of Examples 5, 6 and 7 provided the marks which could be better read without maloperation at the high read rate than the marking composition of Comparative Example 6 comprising the inorganic infrared fluorescent material.

What is claimed is:

1. A fluorescent marking composition for ink jet printing, comprising particles of an organic resin having a glass transition temperature of at least 30° C. and an average particle size of at least 30 nm, and a fluorescent dye emitting fluorescence in a visible light wavelength range that is present in an amount of 0.001 wt. % to 10 wt. %, based on the weight of the particles of the organic resin; and wherein the organic resin is selected from the group consisting of polymethacrylate, polyacrylate, polyvinyl chloride, benzoquanamine, alkyd, urea, vinyl chloride, vinyl acetate copolymer and aromatic sulfonamide resins.

2. The fluorescent marking composition according to claim 1, wherein said particles comprise hollow particles.

3. The fluorescent marking composition according to claim 1, which is used in an ink jet printer and in which a ratio of a viscosity of the composition (mPa.s) to a nozzle diameter of said ink jet printer (μm) is from 0.01 to 1.

4. The fluorescent marking composition according to claim 3, which has a Reynolds number of 10.5 to 2100.

5. The fluorescent marking composition according to claim 3, which has a Weber number of 38.2 to 3360.

6. The fluorescent marking composition according to claim 3, wherein a ratio of a viscosity of said composition (mPa.s) to a surface tension of said composition (mN/m) is from 0.03 to 1.0.

7. An infrared fluorescent marking composition for ink jet printing, comprising particles of an organic resin having a glass transition temperature of at least 30° C. and an average particle size of at least 30 nm, and an infrared fluorescent dye absorbing infrared light having a wavelength of at least 700 nm and emitting light in an infrared wavelength range that is present in an amount of 0.001 wt. % to 15 wt. %, based on the weight of the particles of the organic resin; and wherein the organic resin is selected from the group consisting of polymethacrylate, polyacrylate, polyvinyl chloride, benzoquanamine, alkyd, urea, vinyl chloride, vinyl acetate copolymer and aromatic sulfonamide resins.

8. The infrared fluorescent marking composition according to claim 7, wherein said particles comprise hollow particles.

9. The infrared fluorescent marking composition according to claim 7, which is used in an ink jet printer and in which a ratio of a viscosity of the composition (mPa.s) to a nozzle diameter of said ink jet printer (μm) is from 0.01 to 1.

10. The infrared fluorescent marking composition accodeing to claim 9, which has a Reynolds number of 10.5 to 2100.

11. The infrared fluorescent marking composition according to claim 9, which has a Weber number of 38.2 to 3360.

12. The infrared fluorescent marking composition according to claim 9, wherein a ratio of a viscosity of said composition (mPa.s) to a surface tension of said composition (mN/m) is from 0.03 to 1.0.

13. A fluorescent mark comprising particles of an organic resin having a glass transition temperature of at least 30° C. and an average particle size of at least 30 nm, and a fluorescent dye emitting fluorescence in a visible light wavelength range that is present in an amount of 0.001 wt. % to 10 wt. %, based on the weight of the particles of the organic resin;

wherein the organic resin is selected from the group consisting of polymethacrylate, polyacrylate, polyvinyl chloride, benzoquanamine, alkyd, urea, vinyl chloride, vinyl acetate copolymer and aromatic sulfonamide resins.

14. The fluorescent mark according to claim 13, wherein said particles comprise hollow particles.

15. An infrared fluorescent mark comprising particles of an organic resin having a glass transition temperature of at least 30° C. and an average particle size of at least 30 nm, and an infrared dye absorbing infrared light having a wavelength of at least 700 nm and emitting light in an infrared wavelength range that is present in an amount of 0.001 wt % to 15 wt. %, based on the weight of the particles of the organic resin; and wherein the organic resin is selected from the group consisting of polymethacrylate, polyacrylate, polyvinyl chloride, benzoquanamine, alkyd, urea, vinyl chloride, vinyl acetate copolymer and aromatic sulfonamide resins.

16. The infrared florescent mark according to claim 15, wherein said particles comprise hollow particles.

17. The infrared fluorescent mark according to claim 15, wherein a rise time from 10% to 90% of the maximum light emitting output is 10 μsec. or less, when infrared light is irradiated on said mark.

* * * * *